United States Patent
Nunez (10) Patent No.: US 8,402,926 B1
(45) Date of Patent: Mar. 26, 2013

(54) PET PROTECTIVE BATHING CAP AND METHOD OF USE

(76) Inventor: Barbara Nunez, Boca Raton, FL (US)

( * ) Notice: Subject to any disclaimer, the term of this patent is extended or adjusted under 35 U.S.C. 154(b) by 147 days.

(21) Appl. No.: 12/821,115

(22) Filed: Jun. 22, 2010

Related U.S. Application Data (60) Provisional application No. 61/256,998, filed on Nov. 1, 2009.

(51) Int. Cl.
*A01K 13/00* (2006.01)

(52) U.S. Cl. ............................................. 119/850; 2/68

(58) Field of Classification Search ............... 119/850; D30/145; 2/6, 84, 17, 171, 204
See application file for complete search history.

(56) References Cited

U.S. PATENT DOCUMENTS

| | | | | |
|---|---|---|---|---|
| D41,745 S | * | 9/1911 | Orioli et al. ................ | D30/145 |
| 2,136,115 A | * | 11/1938 | McCaleb ..................... | 54/80.1 |
| 2,726,398 A | * | 12/1955 | Cooper ........................ | 2/68 |
| 3,753,334 A | * | 8/1973 | Blessing ..................... | 54/80.2 |
| 4,134,153 A | * | 1/1979 | Voorhees ..................... | 2/174 |
| D295,565 S | * | 5/1988 | Upton et al. ................. | D30/144 |
| 4,964,264 A | | 10/1990 | Adams | |
| D319,116 S | * | 8/1991 | Ode ............................ | D30/145 |
| 5,163,272 A | * | 11/1992 | Finley et al. ................. | 54/80.1 |
| 5,524,650 A | * | 6/1996 | Ponce ......................... | 132/270 |
| 5,773,802 A | * | 6/1998 | Graves ........................ | 219/759 |
| D404,851 S | * | 1/1999 | Braun ......................... | D30/145 |
| 5,920,912 A | * | 7/1999 | Patchett ...................... | 2/209 |
| D417,315 S | * | 11/1999 | Lowry ........................ | D30/144 |
| 6,298,493 B1 | * | 10/2001 | Ambroise .................... | 2/209 |
| 6,330,721 B1 | * | 12/2001 | Wallace et al. .............. | 2/174 |
| D469,217 S | * | 1/2003 | Kimmons ................... | D28/18 |
| 7,614,089 B2 | * | 11/2009 | Hillman-Schwartz et al. ... | 2/174 |
| 7,946,254 B2 | * | 5/2011 | Chao ........................... | 119/814 |
| 7,946,256 B2 | * | 5/2011 | Mann .......................... | 119/850 |
| 2007/0062462 A1 | | 3/2007 | McGuire | |
| 2009/0178628 A1 | * | 7/2009 | Carmean et al. ............ | 119/850 |
| 2010/0307427 A1 | * | 12/2010 | Mann .......................... | 119/850 |

* cited by examiner

*Primary Examiner* — Yvonne Abbott (74) *Attorney, Agent, or Firm* — Allen D. Hertz, P.A.; Allen D. Hertz (57) ABSTRACT

A pet cap having an integrated cap base gathering member attached about a perimeter of a cap body. The pet cap is placed over a pet's head, covering the pet's ears and ear canals. A grooming party baths the pet. The cap provides a barrier between water and other fluids and the pet's ears and ear canals. A securing strap is provided, spanning across an opening of the pet cap. The securing strap is positioned under the pet's snout to maintain the pet cap in position. The securing strap can be removably attached to the pet cap. The cap can include optional ear cover flaps extending downward from a lower edge of the cap body.

18 Claims, 8 Drawing Sheets

PET PROTECTIVE BATHING CAP AND METHOD OF USE

CROSS REFERENCE TO RELATED APPLICATIONS

This application is a Non-Provisional Application of co-pending Provisional U.S. Patent Application Ser. No. 61/256,998, filed Nov. 1, 2009, the contents of which is incorporated herein by reference into the present application.

FIELD OF THE INVENTION

The present invention relates to a pet ear protection device and method of use, and more particularly, a cap that is placed upon a pet's head, covering the pet's ears.

BACKGROUND OF THE INVENTION

The invention pertains to a protective device for a pet's ears for use while bathing.

Dogs and cats, like humans, are also prone to ear infections. There are three types of ear infections in dogs—the outer ear infection, middle ear infection, and the inner ear infection. It is easy to know if your dog has an outer ear infection. You'll often see the symptoms of this disease, which is usually characterized by inflammation and foul-smelling wax discharge.

The unlikely buildup of disruptive microorganisms such as yeast and bacteria primarily trigger an infection in the outer ear canal. Symptoms include your pet deliberately scratching its ear or vigorously shaking its head. When left unattended, ear infections can produce further physiological damage. Symptoms include the excessive flow of ear discharge or a funky odor emanating from the ear, which likely indicates bacterial infection and inflammation. Frequent ear infections would come about as a sticky medical condition with the worst-case scenario involving the formation of a tumor inside the ear canal. Ear infections that progress to this level require immediate treatment to preclude possible loss of hearing and severe complications.

Both the middle ear and inner ear are regarded to be more severe than outer ear infection. These types of ear concerns in dogs require the help of a veterinarian because the condition can easily get worse and are often not curable unless special treatment procedures are carried out.

It is critical to minimize any potential exposure to what might cause ear infections. One reason why it is difficult to maintain against ear infections is that dog's ears have a vertical and horizontal component to them, which makes it hard for anything to drain out including debris or water.

The presence of water in the ear canal will facilitate the growth for yeast and bacteria. It is highly advisable to drain the ears of the water played dog completely to avoid the recurrent dog's ear infection. Breeds with long ears that flap over the ear canal are more prone for otitis media than breeds with small ear canal.

Maintaining dryness of a pet's ear is helpful to avoid ear infections and other ear health issues. Accordingly, there remains a need in the art for a device that provides an apparatus and method to minimize water intrusion into a pet's ear cavities.

SUMMARY OF THE INVENTION

The present invention overcomes the deficiencies of the known art and the problems that remain unsolved by providing a method and respective apparatus for minimizing water intrusion into a pet's ear cavities.

In accordance with one embodiment of the present invention, the invention consists of a pet cap the cap comprising:
  a cap body fabricated of a water resistant material;
  a cap base gathering member assembled along a cap body perimeter, the cap base gathering member gathering the cap body perimeter; and
  a cap securing strap being attached to the cap body proximate the cap body perimeter.

In a second aspect, the cap base gathering member is fabricated of an elastic material.

Yet another aspect, the cap body is fabricated of a material selected from a cap body material group comprising: Crypton-Green, polyester, nylon, vinyl, treated cotton, neoprene, and the like.

While another aspect, the cap securing strap is fabricated of an elastic material.

With yet another aspect, the cap securing strap is further encased within a tubular strap casing.

Yet another aspect, the cap body further comprises a pair of ear covering flaps extending downward from the cap body perimeter.

Regarding another aspect, the cap securing strap is removably attached to the cap body.

In yet another aspect, the removable attachment utilizing first and second mating members forming a detachable interface.

With regards to another aspect, the first and second mating members utilize a dense hook and loop interface.

While another aspect, the first member provides an aperture, wherein the second member is the strap body, the strap body being inserted through the aperture forming an attachment loop.

And with another aspect, a method of use includes the steps of:
  obtaining a pet cap, the pet cap comprising:
  a cap body fabricated of a water resistant material;
  a cap base gathering member assembled along a cap body perimeter, the cap base gathering member gathering the cap body perimeter; and
  a cap securing strap being attached to the cap body proximate the cap body perimeter;
  orienting the pet cap for placement upon a pet's head;
  raising pet's ears upwards;
  placing the pet cap onto the pet's head, covering the pet's ears;
  securing the pet cap onto the pet's head by positioning the cap securing strap under pet's chin;
  bath the pet;
  dry the pet; and
  remove the pet cap.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
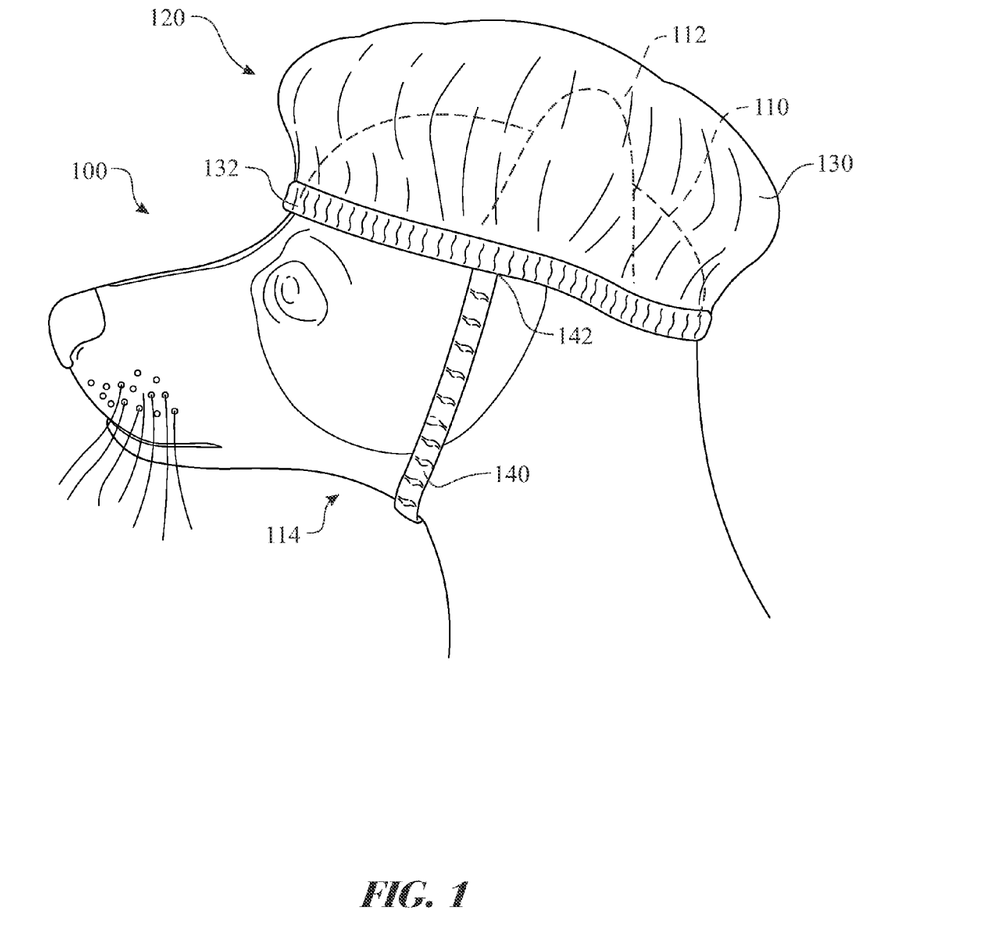
FIG. 1 presents a side elevation view of a pet cap as worn by a pet during bathing.

For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
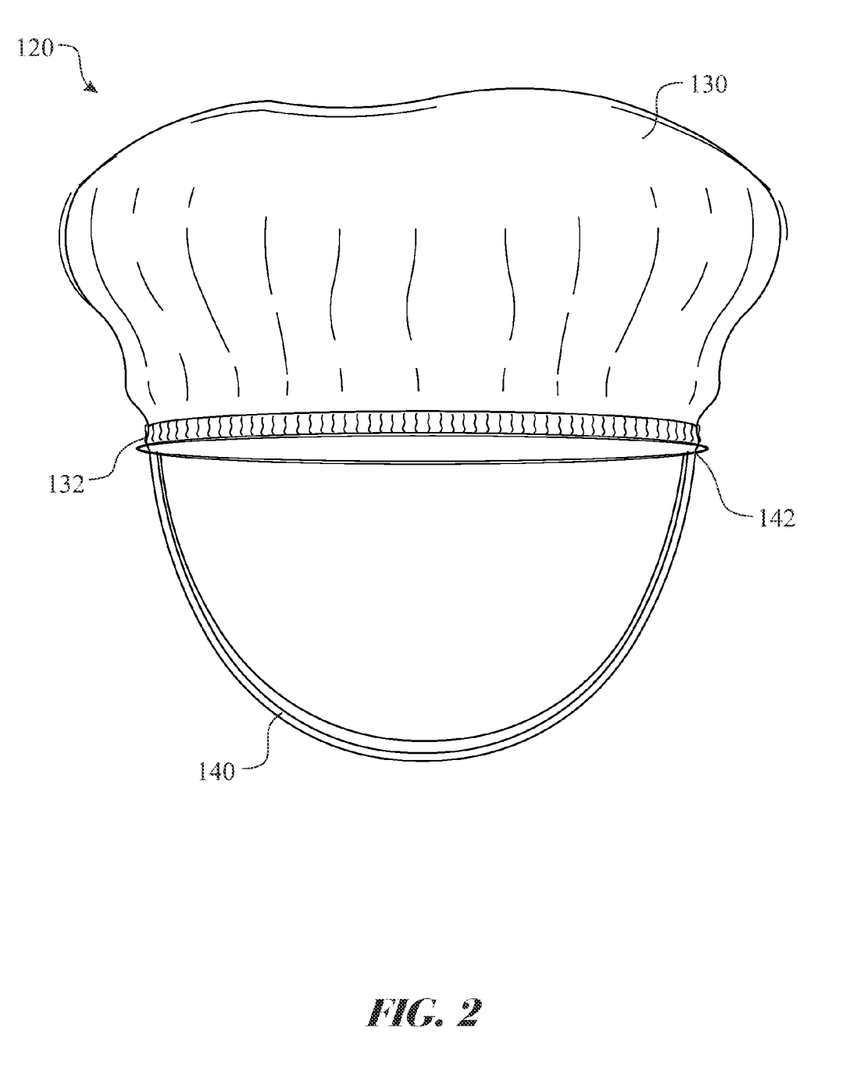
FIG. 2 presents a front elevation view of the pet cap of FIG. 1.
Figure 3:
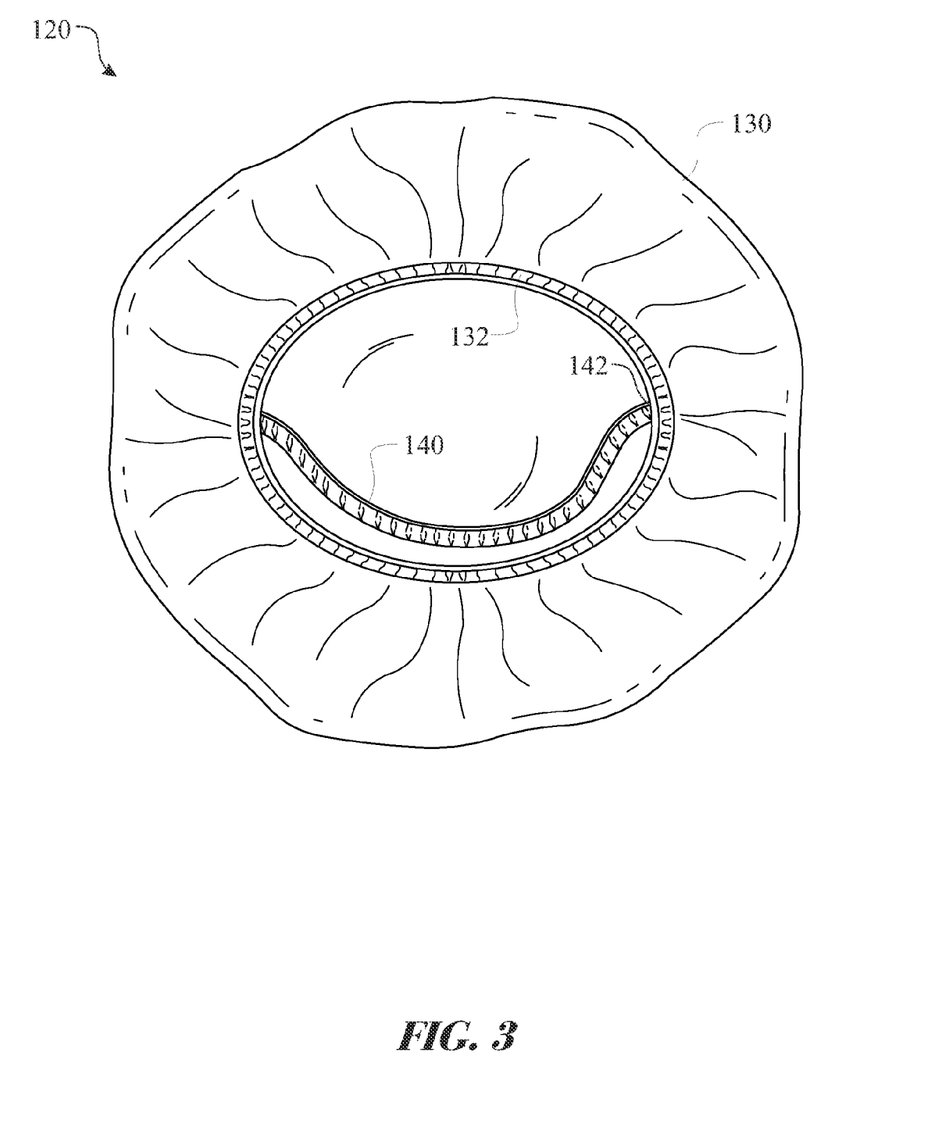
FIG. 3 presents a bottom view of the pet cap of FIG. 1.

A first exemplary pet cap is referred to as a pet cap 120, which is illustrated in FIGS. 1 through 3. The pet cap 120 is designed to be placed upon an upper head area 110 of a pet's head 100. The basis of the pet cap 120 is a cap body 130. The cap body 130 is fabricated of a water resistant or waterproof material, such as a polyester blend provided under the trade name Crypton-Green, other polyester materials, nylon, vinyl, treated cotton, neoprene, and the like. It is understood the cap body 130 can be fabricated having a waterproof inner layer and a decorative outer layer. The cap body 130 can include prints, weave and other decorative features. The initial prototypes utilize material comprising a design within images related to pets, including woven images of dogs, dog bones, and the like. The cap body 130 is cut in a circular or oval pattern. A cap base gathering member 132 is stitched about a perimeter of the cap body 130. The cap base gathering member 132 is preferably of an elastic material. The cap base gathering member 132 can be directly attached to the cap body 130 or inserted into a casing formed along the perimeter of the cap body 130. A cap securing strap 140 is attached to the cap body 130 via a securing strap to cap interface 142. It is understood that the cap securing strap 140 can alternately be attached to the cap base gathering member 132 and should be considered as synonymous.

The user would raise the pet's ear 112, positioning the pet's ear 112 upon the upper head area 110. The user then places the cap body 130 covering the pet's ears 112, with the cap body 130 resting on the upper head area 110. The cap securing strap 140 is positioned under the pet's snout bottom region 114, securing the pet cap 120 onto the pet's head 100. The cap body 130 keeps water from gathering on an underside of the pet's ears 112 and entering an ear canal (not illustrated but well known by description). By minimizing long term moisture residing on the underside of the pet's ears 112, thus reducing risk for yeast, bacteria, and other health inhibiting scenarios.

Figure 4:
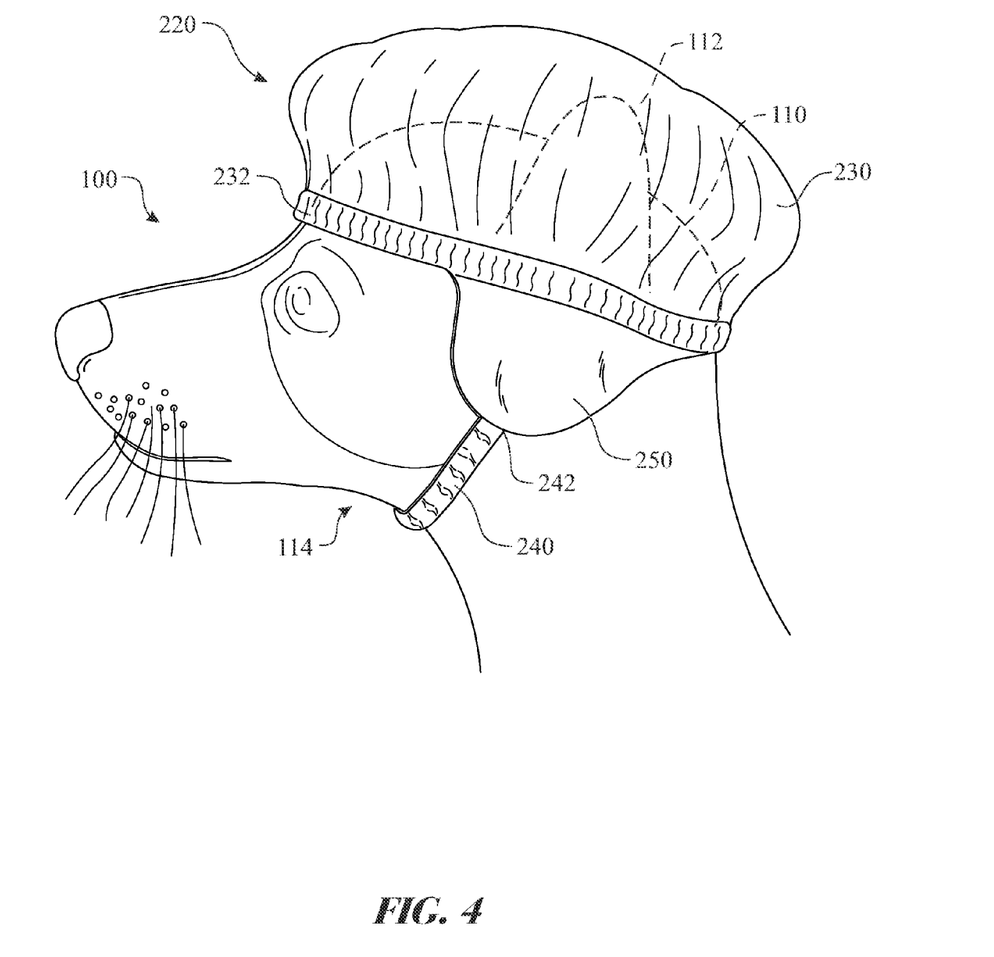
FIG. 4 presents a side elevation view of an enhanced pet cap as worn by a pet during bathing.

Certain breeds have long floppy ears having ear canals that are positioned lower than breeds having stiff, upward standing ears. A second exemplary embodiment, referred to as a pet cap 220, is illustrated in FIG. 4. Like features of pet cap 220 and pet cap 120 are numbered the same except preceded by the numeral '2'. An ear cover flap 250 is integrated into the pet cap 220, wherein the ear cover flap 250 extends downward covering a lower portion of the pet's head. The ear cover flap 250 is sized to extend below the lower portion of the pet's ear canal. The cap securing strap 240 is attached to a lower apex of the ear cover flap 250 at a securing strap to cap interface 242. The cap securing strap 240 maintains the ear cover flap 250 positioned covering the pet's ear 112.

Figure 5:
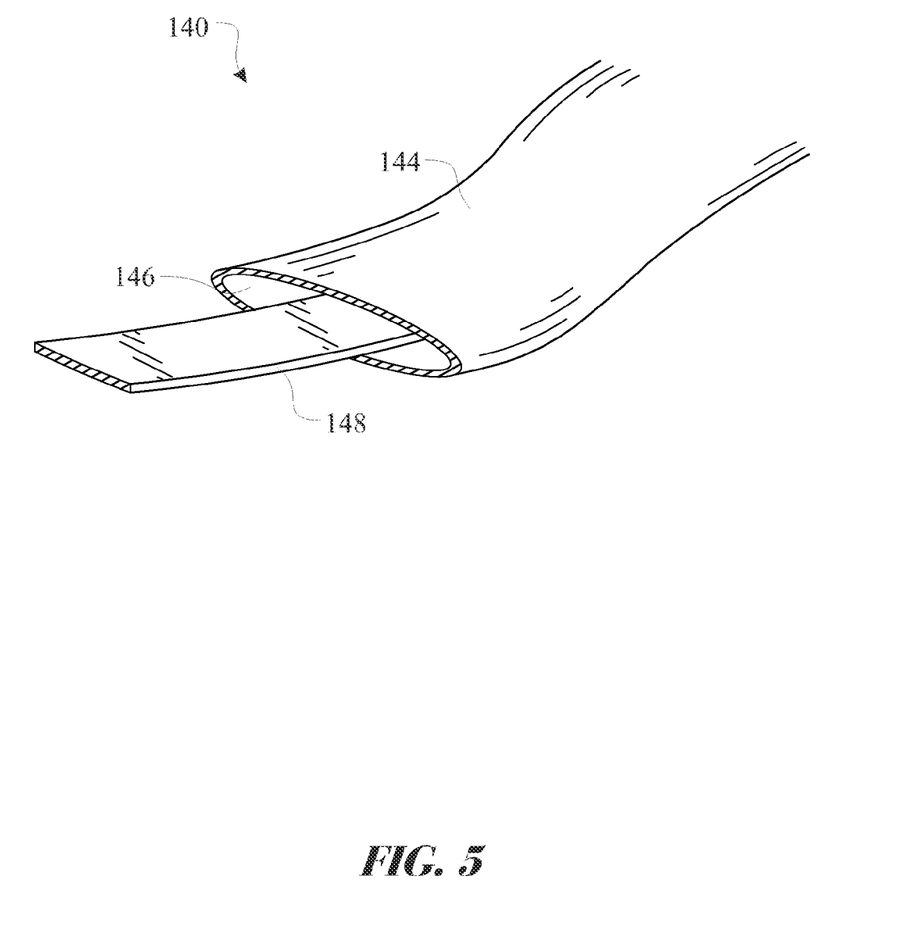
FIG. 5 presents an isometric view detailing one exemplary embodiment of a securing strap assembly.

The cap securing strap 140 can be provided in any of a variety of form factors. A first exemplary configuration is illustrated in FIG. 5. The cap securing strap 140 is fabricated inserting a securing strap band 148 through a securing strap sleeve interior 146 of a tubular securing strap casing 144. The securing strap band 148 is preferably elastic. The tubular securing strap casing 144 can be fabricated of the same material as the cap body 130, providing a congruous appearance. The tubular securing strap casing 144 can be woven in a tubular shape or formed from a planar material by attaching two parallel edges. The tubular securing strap casing 144 is gathered over the securing strap band 148, allowing the securing strap band 148 to expand.

Figure 6:
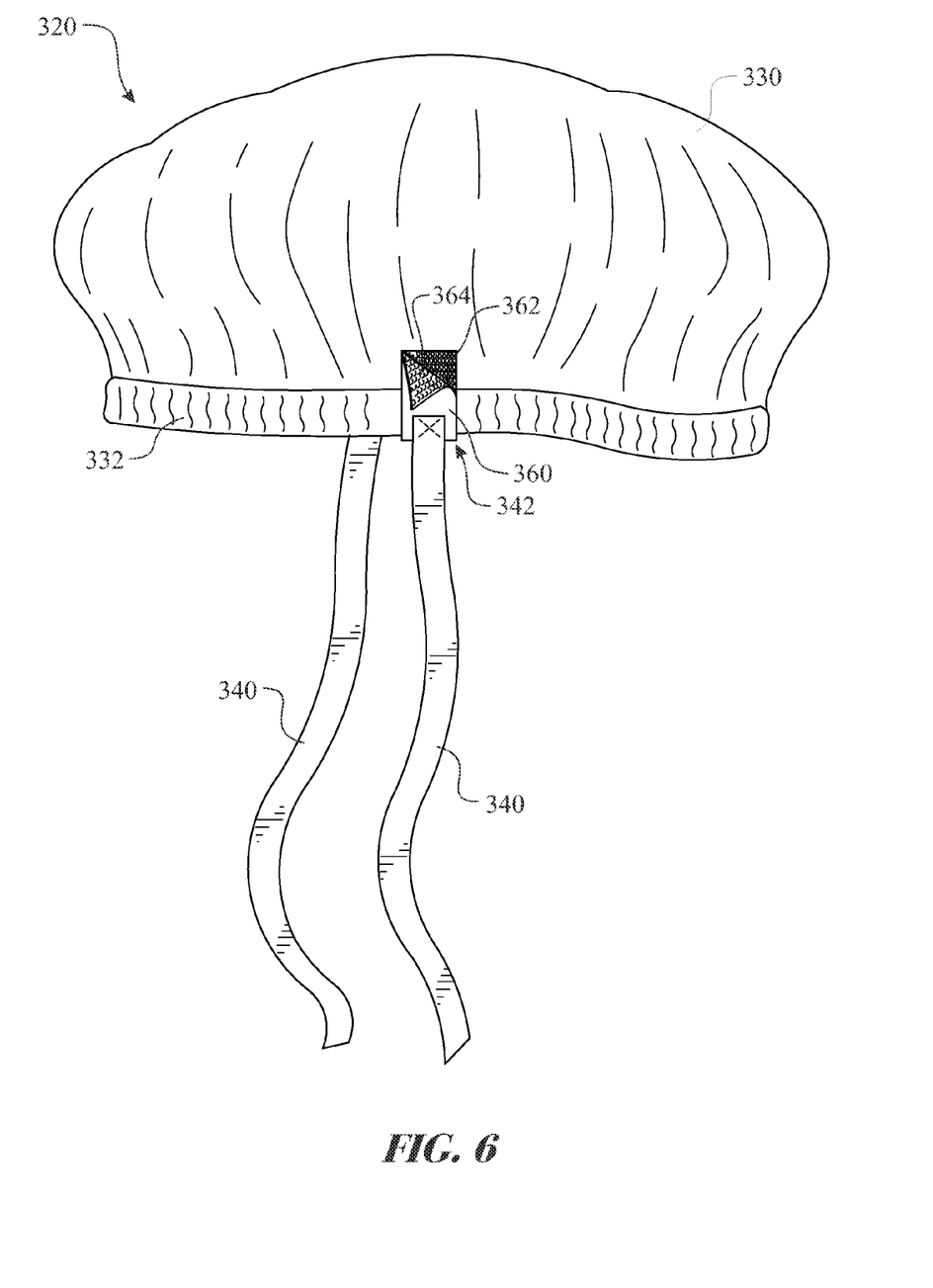
FIG. 6 presents a side elevation view of a pet cap introducing a first exemplary detachable strap interface.

Other alternate form factors can be utilized for the cap securing strap 140. One alternate form factor is utilized on an exemplary third embodiment of the present invention, referred to as a pet cap 320, is illustrated in FIG. 6. Like features of pet cap 320 and pet cap 120 are numbered the same except preceded by the numeral '3'. A cap securing strap 340 is provided in two separate lengths, being fastened together about the pet's snout bottom region 114 by any known method, including tying, inclusion of clips, snaps, and the like. The cap securing strap 340 can be removable attached to the cap body 330 via a detachable interface assembly 360. The exemplary detachable interface assembly 360 utilizes a dense hook and loop interface, providing a first attachment surface 362 affixed to the cap body 330 and a mating attachment surface 364 affixed to a coupling end of each cap securing strap 340. The illustration presents a dense loop material applied to the cap body 330 and referred to as the first attachment surface 362. A dense loop material is applied to the cap securing strap 340 and referred to as the mating attachment surface 364. It is understood that the first attachment surface 362 can be applied to the cap body 330 as illustrated or onto an ear cover flap similar to the ear cover flap 250 of FIG. 4.

Figure 7:
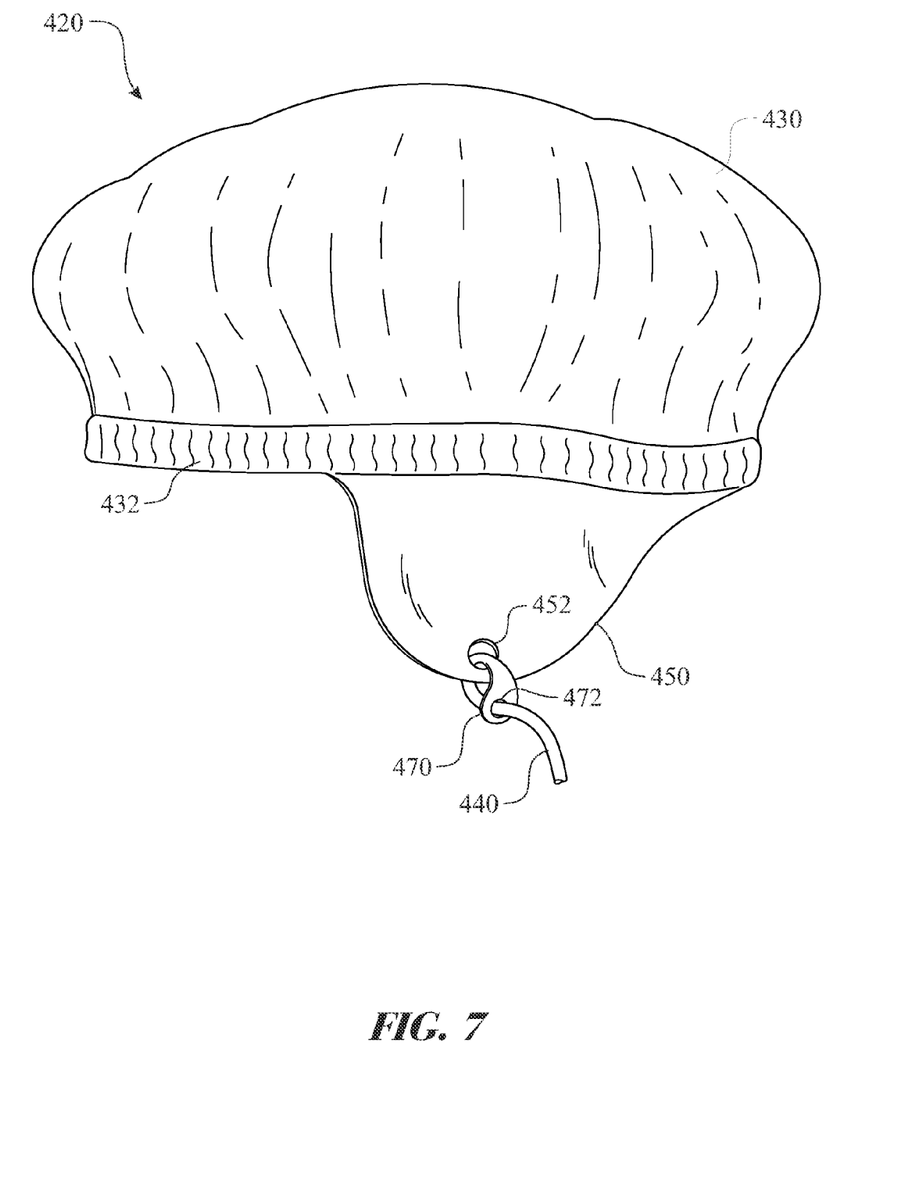
FIG. 7 presents a side elevation view of a pet cap incorporating a second exemplary detachable strap interface.

A second alternate form factor is utilized on an exemplary fourth embodiment of the present invention, referred to as a pet cap 420, is illustrated in FIG. 7. Like features of pet cap 420 and pet cap 220 are numbered the same except preceded by the numeral '4'. A cap securing strap 440 is provided in two separate lengths, being fastened together about the pet's snout bottom region 114 by any known method, including tying, inclusion of clips, snaps, and the like. A strap receiving aperture 452 is provided through a lower region of an ear cover flap 450. The cap securing strap 440 is provided having an attachment strap end 470 at an attachment end and a distal end at the opposite end of the length of the cap securing strap 440. The cap securing strap 440 can be removable attached to the cap body 430 by inserting the distal end of the cap securing strap 440 through the strap receiving aperture 452, then threaded through the attachment strap aperture 472 and pulled taught. This configuration removably attaches each of the pair of cap securing straps 440 to each of the ear cover flaps 450 as illustrated.

Figure 8:
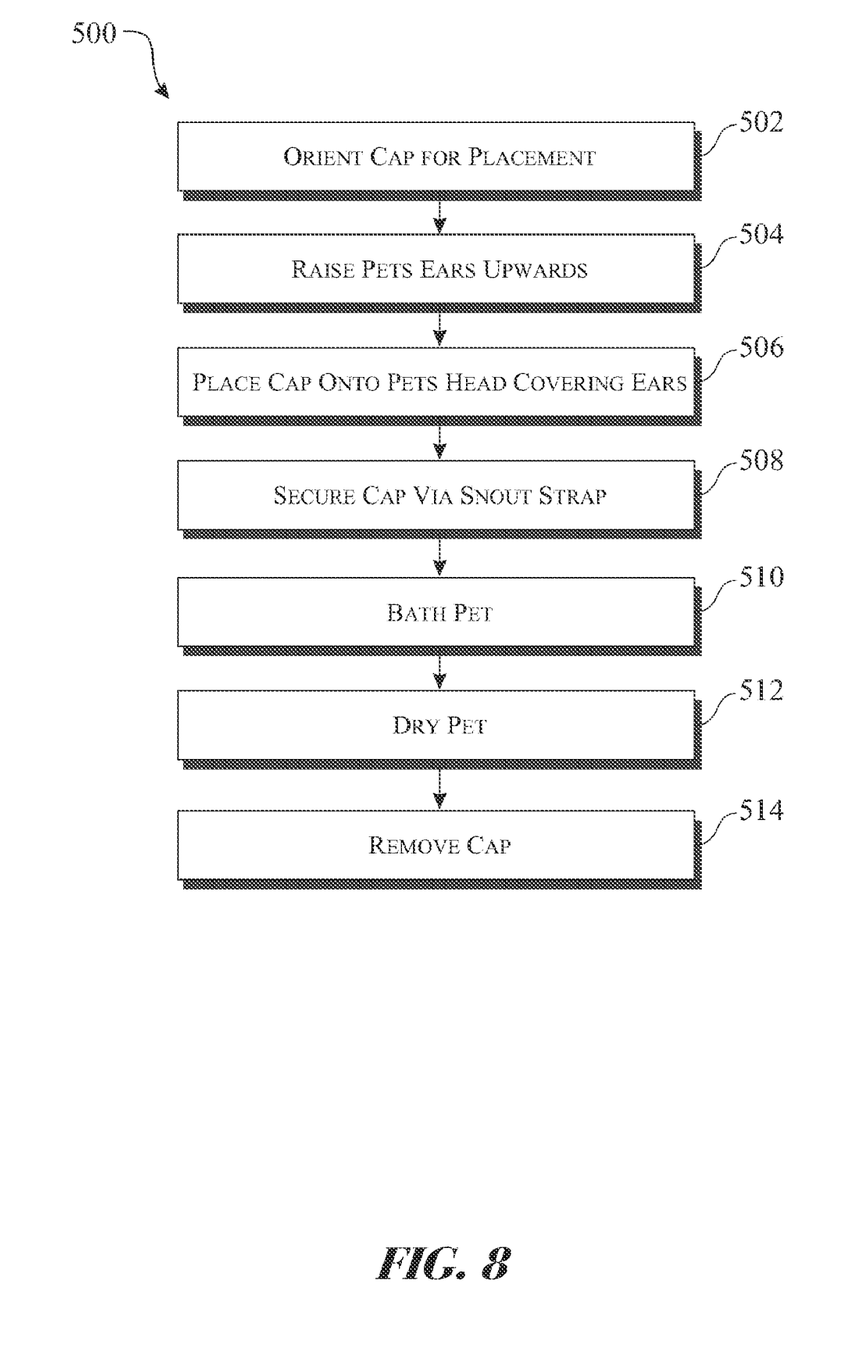
FIG. 8 presents an exemplary flow diagram of a method of protecting pet's ears during bathing.

A method of use of the pet cap 120, 220, 320, 420 is presented in an exemplary pet bathing process flow diagram 500 illustrated in FIG. 8. The pet bathing process flow diagram 500 initiates with a step of obtaining and orienting a cap for placement upon a pet's head step 502. The grooming party raises the pet's ears 504, placing the pet's ears underneath the pet cap 506. The pet cap is positioned upon the top portion of the pet's head, securing the ears underneath the pet cap. The securing strap is routed and secured under the pet's snout 508. The grooming party baths the pet 510 and dries the pet 512. When finished, the grooming party removes the pet cap 514 from the pet. The grooming party checks to ensure the ear region is dry. The grooming party dries and returns the pet cap to a storage area.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A method of protecting pet's ears during bathing, the method comprising the steps of:
   obtaining a pet cap, the pet cap comprising:
   a cap body fabricated of a water resistant material;
   a cap base gathering member assembled along a cap body perimeter, the cap base gathering member gathering the cap body perimeter; and
   a cap securing strap being attached to the cap body proximate the cap body perimeter;
   orienting the pet cap for placement upon a pet's head;
   raising pet's ears upwards;
   placing the pet cap onto the pet's head, covering the top portion of the pet's head and the pet's ears;
   positioning an ear cover flap to cover each respective pet's ear canal, each ear cover flap extending downward from the cap body in alignment with a position of each pet's ear;
   ensuring the pet cap covers each of the pet's ear canals to prevent moisture from collecting therein;
   securing the pet cap onto the pet's head by positioning the cap securing strap under a pet's chin;
   bathing the pet; and
   removing the pet cap.

2. A method of protecting pet's ears during bathing as recited in claim 1, the method further comprising a step of stretching an elastic cap securing strap, positioning the cap securing strap under a pet's chin for maintaining the pet cap in positioned on a pet's head.

3. A method of protecting pet's ears during bathing as recited in claim 1, the method further comprising a step of tying a two piece cap securing strap under a pet's chin for maintaining the pet cap in positioned on a pet's head.

4. A method of protecting pet's ears during bathing as recited in claim 1, the method further comprising a step of expanding the cap base gathering member to fit about an upper portion of a pet's head, wherein the cap base gathering member is of an elastic material.

5. A method of protecting pet's ears during bathing as recited in claim 1, the method further comprising a step of removing a removable cap securing strap from the cap body using a detachable interface assembly comprising a first attachment surface applied to the cap body and a mating attachment surface applied to the cap securing strap.

6. A method of protecting pet's ears during bathing as recited in claim 5, wherein the first attachment surface comprises a dense hook and loop tape first portion and the mating attachment surface comprises a dense hook and loop tape mating portion;
   the step of securing the pet cap onto the pet's head further comprises a step of securing the dense hook and loop tape first portion and the dense hook and loop tape mating portion together; and
   the step of removing a removable cap securing strap from the cap body further comprises a step of detaching the dense hook and loop tape first portion and the dense hook and loop tape mating portion from one another.

7. A method of protecting pet's ears during bathing, the method comprising the steps of:
   obtaining a pet cap, the pet cap comprising:
   a cap body fabricated of a water resistant material having an oval shaped cap body perimeter;
   a cap base gathering member assembled along the cap body perimeter, the cap base gathering member gathering the cap body perimeter; and
   a cap securing strap being attached to the cap body proximate the cap body perimeter;
   orienting the pet cap for placement upon a pet's head;
   raising pet's ears upwards;
   placing the pet cap onto the pet's head, covering the top portion of the pet's head and the pet's ears;
   positioning an ear cover flap to cover each respective pet's ear canal, each ear cover flap extending downward from the cap body in alignment with a position of each pet's ear;
   ensuring the pet cap covers each of the pet's ear canals to prevent moisture from collecting therein;
   securing the pet cap onto the pet's head by positioning the cap securing strap under a pet's chin;
   bathing the pet; and
   removing the pet cap.

8. A method of protecting pet's ears during bathing as recited in claim 7, the method further comprising a step of stretching an elastic cap securing strap, positioning the cap securing strap under a pet's chin for maintaining the pet cap in positioned on a pet's head.

9. A method of protecting pet's ears during bathing as recited in claim 7, the method further comprising a step of tying a two piece cap securing strap under a pet's chin for maintaining the pet cap in positioned on a pet's head.

10. A method of protecting pet's ears during bathing as recited in claim 7, the method further comprising a step of expanding the cap base gathering member to fit about an upper portion of a pet's head, wherein the cap base gathering member is of an elastic material.

11. A method of protecting pet's ears during bathing as recited in claim 7, the method further comprising a step of removing a removable cap securing strap from the cap body using a detachable interface assembly comprising a first attachment surface applied to the cap body and a mating attachment surface applied to the cap securing strap.

12. A method of protecting pet's ears during bathing as recited in claim 11, wherein the first attachment surface comprises a dense hook and loop tape first portion and the mating attachment surface comprises a dense hook and loop tape mating portion;
   the step of securing the pet cap onto the pet's head further comprises a step of securing the dense hook and loop tape first portion and the dense hook and loop tape mating portion together; and
   the step of removing a removable cap securing strap from the cap body further comprises a step of detaching the dense hook and loop tape first portion and the dense hook and loop tape mating portion from one another.

13. A method of protecting pet's ears during bathing, the method comprising the steps of:
   obtaining a pet cap, the pet cap comprising:
      a cap body fabricated of a water resistant material having an oval shaped cap body perimeter;
      a cap base gathering member assembled along the cap body perimeter, the cap base gathering member gathering the cap body perimeter;
      an ear cover flap extending downward from the cap body perimeter; and
      a cap securing strap being attached to a lower portion of the ear cover flap;
   orienting the pet cap for placement upon a pet's head;
   raising pet's ears upwards;
   placing the pet cap onto the pet's head, covering the top portion of the pet's head and the pet's ears;
   securing the pet cap onto the pet's head by positioning the cap securing strap under a pet's chin;
   bath the pet;
   dry the pet; and
   remove the pet cap.

14. A method of protecting pet's ears during bathing as recited in claim 13, the method further comprising a step of stretching an elastic cap securing strap, positioning the cap securing strap under a pet's chin for maintaining the pet cap in positioned on a pet's head.

15. A method of protecting pet's ears during bathing as recited in claim 13, the method further comprising a step of tying a two piece cap securing strap under a pet's chin for maintaining the pet cap in positioned on a pet's head.

16. A method of protecting pet's ears during bathing as recited in claim 13, the method further comprising a step of positioning an ear cover flap to cover each respective pet's ear canal, each ear cover flap extending downward from the cap body in alignment with a position of each pet's ear.

17. A method of protecting pet's ears during bathing as recited in claim 13, the method further comprising a step of expanding the cap base gathering member to fit about an upper portion of a pet's head, wherein the cap base gathering member is of an elastic material.

18. A method of protecting pet's ears during bathing as recited in claim 13, the method further comprising a step of removing a removable cap securing strap from the cap body using a detachable interface assembly comprising a first attachment surface applied to the cap body and a mating attachment surface applied to the cap securing strap.

* * * * *